United States Patent [19]

Bestler et al.

[11] Patent Number: 4,947,429
[45] Date of Patent: Aug. 7, 1990

[54] PAY PER VIEW TELEVISION SIGNALING METHOD

[75] Inventors: Charles B. Bestler, Chicago; Richard W. Citta, Oak Park; Paul M. Gosc, Buffalo Grove, all of Ill.

[73] Assignee: Zenith Electronics Corporation, Glenview, Ill.

[21] Appl. No.: 442,474

[22] Filed: Nov. 22, 1989

Related U.S. Application Data

[63] Continuation of Ser. No. 126,452, Nov. 30, 1987, abandoned.

[51] Int. Cl.$^5$ .............................................. H04L 9/02
[52] U.S. Cl. ........................................ 380/20; 358/84
[58] Field of Search .............................. 358/84; 380/20

[56] References Cited

U.S. PATENT DOCUMENTS

| | | | |
|---|---|---|---|
| 3,886,302 | 5/1975 | Kosco | 380/20 |
| 4,163,254 | 7/1979 | Block et al. | 380/20 |
| 4,484,217 | 11/1984 | Block et al. | 380/20 |
| 4,528,589 | 7/1985 | Block et al. | 380/20 |
| 4,536,791 | 8/1985 | Campbell et al. | 380/20 |
| 4,700,386 | 10/1987 | Kohn | 380/20 |
| 4,712,238 | 12/1987 | Gilhousen et al. | 380/20 |
| 4,736,421 | 4/1988 | Morita et al. | 380/20 |
| 4,797,918 | 1/1989 | Lee et al. | 380/20 |

Primary Examiner—Thomas H. Tarcza
Assistant Examiner—David Cain

[57] ABSTRACT

A method of operating a pay per view television system in which the television signal includes a program tag and an IPPV tag identifying memory locations in subscriber authorization memories. A subscriber can self-authorize his terminal decoder to unscramble a pay per view program with a password that inputs a "1" to the memory location identified by the IPPV tag. The program tag is changed to indicate the memory location identified by the IPPV tag, thus enabling subscribers who bought the program to unscramble the signal. The head-end periodically polls each subscriber terminal to determine the status of the second memory location and to reset it to "0" after the pay per view event.

12 Claims, 2 Drawing Sheets

PAY PER VIEW TELEVISION SIGNALING METHOD

This application is a continuation of application Ser. No. 126,452, filed Nov. 30, 1987; now abandoned.

BACKGROUND OF THE INVENTION AND PRIOR ART

This invention relates generally to pay television systems and particularly to a method of operating a pay television system with provision for subscriber self-authorization to permit viewing of special pay per view programs.

While the inventive system and method will be described in a cable television environment, it will be appreciated that over-the-air television signalling systems can also benefit from the invention. In pay per view television systems selected channels or events, such as sports programs and the like, are generally made available to system subscribers for a fee in addition to that normally charged for the cable or subscription service. The invention provides a cable television system with subscriber terminals having authorization memories which the subscribers can self-authorize to view a special impulse pay per view (IPPV) feature. The invention further provides for two-way communication to enable polling of the individual subscriber terminal authorization memories to determine which, if any, IPPV programs have been "bought."

In pay television systems, each subscriber terminal is typically identified by a unique address which permits the cable head-end to selectively communicate with the terminals. Each subscriber terminal also includes a controller and an authorization memory which has a plurality of memory locations containing authorization data defining the levels of service for which the subscriber has paid. Unscrambling means in the individual subscriber terminal decoders are controlled by the authorization memory for selectively enabling unscrambling and viewing of scrambled television signals sent from the cable head-end. In some systems, television signals are transmitted from the head-end with a program tag, included in a data packet, that identifies a particular single-bit memory location in the subscriber terminal authorization memory. The corresponding memory location stores either a logic "1" or "0" bit establishing whether the subscriber is authorized or not authorized, respectively, for receiving the accompanying program. In the IPPV system of the invention, the data packet also includes an IPPV program tag which identifies a memory location in the subscriber terminal authorization memory that may be the same or different from the memory location identified by the program tag. A received non-zero IPPV tag results in a suitable display on the subscriber terminal decoder for indicating that the program associated with the IPPV tag may be bought in response to the subscriber taking appropriate action. In the preferred embodiment, the appropriate action consists of the subscriber using a personal password to access the authorization memory and set the memory location defined by the IPPV tag to "1" thereby self-authorizing the terminal for receiving the program. On a periodic basis, the head-end "polls" each subscriber terminal in the system for reading the contents of their respective authorization memories. The subscriber terminals individually respond by transmitting authorization memory information to enable the head-end to determine the status of the memory location or locations defined by the IPPV tag or tags. Based upon the memory information, the head-end determines whether the subscriber "bought" one or more IPPV programs and thereby the amount that is to be billed for such special event programming.

As will be seen, the program tag controls unscrambling of the accompanying signal by reading the authorization memory, whereas the IPPV tag controls self-authorization and the display by permitting writing to the authorization memory. The tags are independent of each other and give the head-end a great deal of flexibility in modes of operation.

With the system, subscriber terminal authorization memories of very limited size may be utilized to support an IPPV system. It will be appreciated that more than one IPPV tag may be used in the system by appropriate selection of different memory locations for different special programs.

OBJECTS OF THE INVENTION

A principal object of the invention is to provide a novel pay per view television system.

Another object of the invention is to provide a method of operating a scrambled television signalling system.

A further object of the invention is to provide a method of operating a pay per view television communication system that requires only minimal memory in subscriber terminals.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
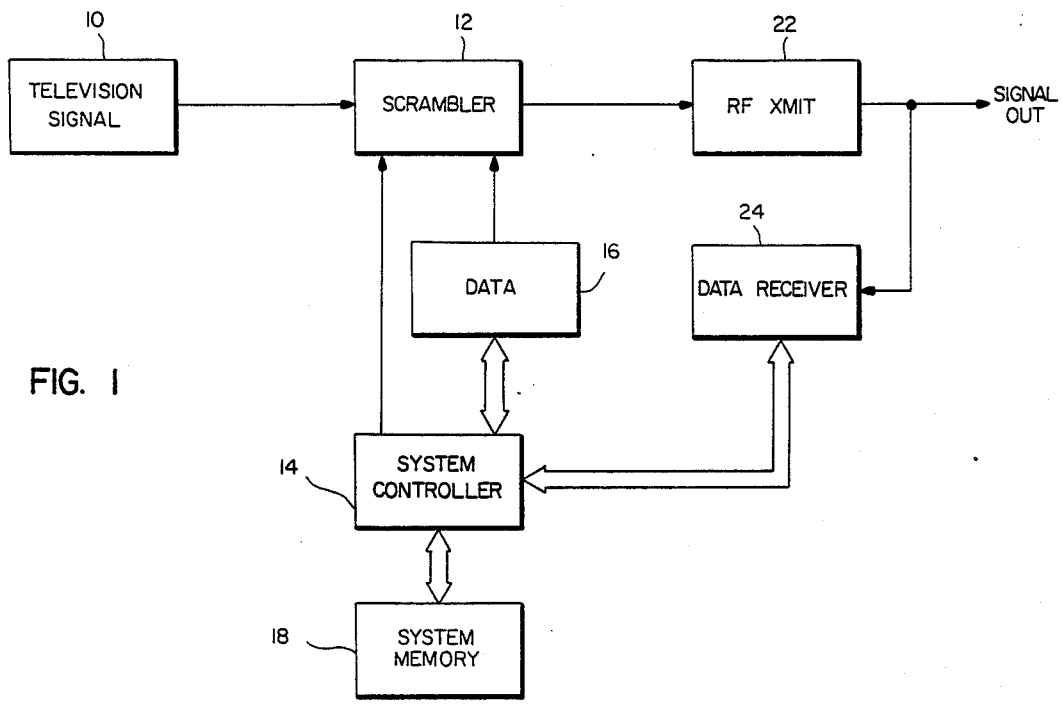
FIG. 1 is a block diagram of a head-end constructed in accordance with the invention.

The encoder of FIG. 1 includes a television signal source 10 which is coupled to a scrambler 12 where the television signal is subjected to scrambling (encoding) by any of a number of well-known techniques. A computer based system controller 14 is coupled via two-way communication buses to a data source 16, to a system memory 18 and to a data receiver 24. System memory 18 includes the addresses of all system subscriber terminals, their authorization status and other information relative thereto. Data source 16 formats the address and data information in appropriate data packets for transmission with the television signal. System controller 14 controls operation of scrambler 12 and data source 16. The data is preferably transmitted in-band by modulating, for example, the widths of the horizontal blanking intervals or, alternatively, may be transmitted out-of-band on a separate RF carrier. Scrambler 12 supplies an RF transmitter 22 for modulating the scrambled video signal and data (in the case of in-band data transmission) onto an RF carrier for transmission to all subscriber terminals. A data receiver 24 is coupled to the signal output line for receiving data sent back by the individual subscriber terminals in response to polling commands sent to the subscriber terminals.

Figure 2:
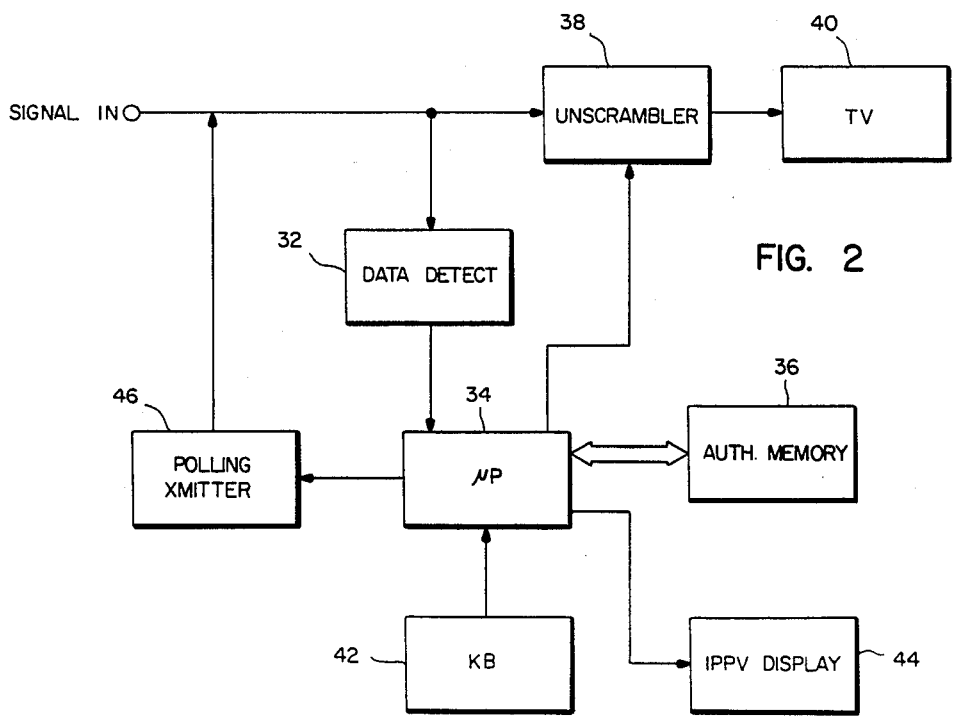
FIG. 2 is a block diagram of a decoder constructed in accordance with the invention.

Each subscriber terminal is equipped with a decoder, similar to that of FIG. 2, which receives the transmitted signal at a signal input terminal and couples it to an unscrambler 38 and to a data detection circuit 32. The data detection circuit supplies detected data to a microprocessor 34 which is linked by a two-way communication bus to a subscriber terminal authorization memory 36. Microprocessor 34 controls operation of unscrambler 38 for unscrambling video signals for which the authorization memory 36 indicates the terminal is authorized. The output of unscrambler 38 is supplied to a conventional television receiver 40. A keyboard 42 is coupled to microprocessor 34 for enabling an authorization code to be input to a memory location in authorization memory 36 that corresponds to an IPPV tag. A display 44 is also controlled by microprocesser 34 for indicating when a special program, identified by an IPPV tag, is available for purchase. A polling transmitter 46 is linked to microprocessor 34 and supplies data, in appropriate form, to the signal input terminal for transmission back to the head-end in response to a polling command.

In operation, a transmitted television signal, including coded binary data, is sent to and received by all subscriber terminals in what is referred to as a "global" packet. A global packet is one that all subscribers are able to decode. An addressed packet, on the other hand, is only decoded by the corresponding subscriber terminal. The binary data is sent in one or more such global packets. A global packet includes a program tag associated with the television signal being transmitted. The program tag identifies a single-bit memory location in each subscriber terminal authorization memory. This memory location is set with an authorization code ("1") if the terminal is authorized to decode the accompanying signal or a non-authorization code ("0") if not authorized. The microprocessor in the subscriber terminal selectively controls operation of the unscrambler to unscramble the received television signal by checking the contents of the memory location identified by the program tag. The global packet also includes an IPPV tag which identifies one of a group of memory locations in each subscriber terminal authorization memory used for IPPV programming.

If the IPPV is set to zero, the accompanying program is not an IPPV program and not available for an impulse purchase. Therefore, the subscriber terminal cannot be self-authorized. A non-zero IPPV tag indicates an IPPV program. If the memory location identified by the IPPV tag has a "0", an IPPV display on the decoder informs the subscriber that the terminal may be selfauthorized to permit viewing of the program. (If the memory location has a "1", there is no IPPV display.) A subscriber terminal may be self-authorized by entry of a password which puts a "1" in the memory location designated by the IPPV tag. Selfauthorization of the terminal changes the IPPV display back to the normal display. The accompanying program will now be viewable in unscrambled form, assuming the program tag designates the same memory location. With this arrangement, the head-end can pre-authorize selected subscriber terminals for one or more IPPV programs by setting authorization codes of "1" in a certain memory location or locations.

To preclude uncontrolled authorization of special pay programs, each subscriber is assigned a personal password which microprocessor 34 recognizes as being valid to authorize purchase of IPPV programs. This feature, while not part of the present invention, is useful to prevent children, for example, from watching adult type material or from authorizing IPPV programs without permission.

The head-end, on a periodic basis, sequentially interrogates or polls each subscriber terminal via addressed packets. Each terminal responds by transmitting the contents of its authorization memory 36, via messages from polling transmitter 46, back to the head-end. The head-end receives the data by means of data receiver 24 and compares the memory locations to determine which IPPV programs, if any, were self-authorized at the subscriber terminal. These messages are identified by the head-end with individual subscribers in the order in which they are received as is well-known in the art. The IPPV memory locations of the subscriber terminal are reset from the head-end after the conclusion of the PPV event via instructions included in data packets addressed to the individual subscriber terminal or via instructions in global packets.

The following examples will help to illustrate the features of the inventive method. Assume that 32 memory locations of the authorization memory are identified by program tags from zero to 31. Assume also that a scrambled program signal is being sent on a given television channel and is to be followed in five or ten minutes, for example, by an IPPV program, and that the program tag, corresponding to the present scrambled signal, is 20 and that the IPPV tag is zero. (Setting the IPPV tag to zero precludes subscriber self-authorization and is useful to assure that subscribers do not purchase special programs in the middle of, or near the end of, a program.) Within the prescribed period at the end of the present program, the program tag remains at 20 but the IPPV tag is changed to 18, for example, to designate a memory location that is set to "0". This is reflected in an IPPV display on the decoder notifying subscribers that an IPPV program, that will be aired shortly, is now available for purchase. A subscriber wishing to purchase the IPPV program enters his password, which authorizes memory location 18 by setting it to "1". When the IPPV program commences, the program tag is changed to 18, corresponding to the previous IPPV tag, and the IPPV tag remains at 18 for a limited time period during which subscribers may still self-authorize their decoders to unscramble the IPPV program presently being transmitted. After expiration of that time period, the program tag remains at 18 during the television presentation, but the IPPV tag is changed to zero to preclude further self-authorizations. This feature prevents subscriber confusion as to which IPPV program is being purchased, i.e., the present one or a subsequent one. Should a pre-authorization of that IPPV program have been made for that subscriber terminal, memory location 18 would have been set to "1" instead of "0", and no special IPPV display would have been shown at that particular subscriber terminal.

In a preview implementation of the inventive method, the television signal is transmitted with a program tag for which all subscriber terminals are authorized and with an IPPV tag to allow self-authorization for an upcoming IPPV program. In this embodiment, a subscriber may be conveniently notified that the program is available for purchase by an on-screen IPPV display since all subscriber terminals unscramble the signal. Subscribers would self-authorize their terminals as before via their keyboards and passwords. When the IPPV program commences, the program tag is changed to identify the same memory location previously used for the IPPV tag and the IPPV tag is changed to zero. Those subscriber terminals that had been self-authorized continue to unscramble the signal, whereas others do not and are prevented from being self-authorized. The IPPV tag change to zero is preferably delayed for a short period to enable late viewers to self-authorize their terminals to unscramble the program although they would not receive a preview. Preauthorized terminals would not receive the IPPV display since the memory location designated by the IPPV tag would have already been set to "1".

As will be apparent to those skilled in the art, the inventive system uses the authorization memory for both regular programs and IPPV programs. This lends a great deal of flexibility to the system and permits the head-end a wide assortment of revenue-enhancing programming options.

Figure 3:
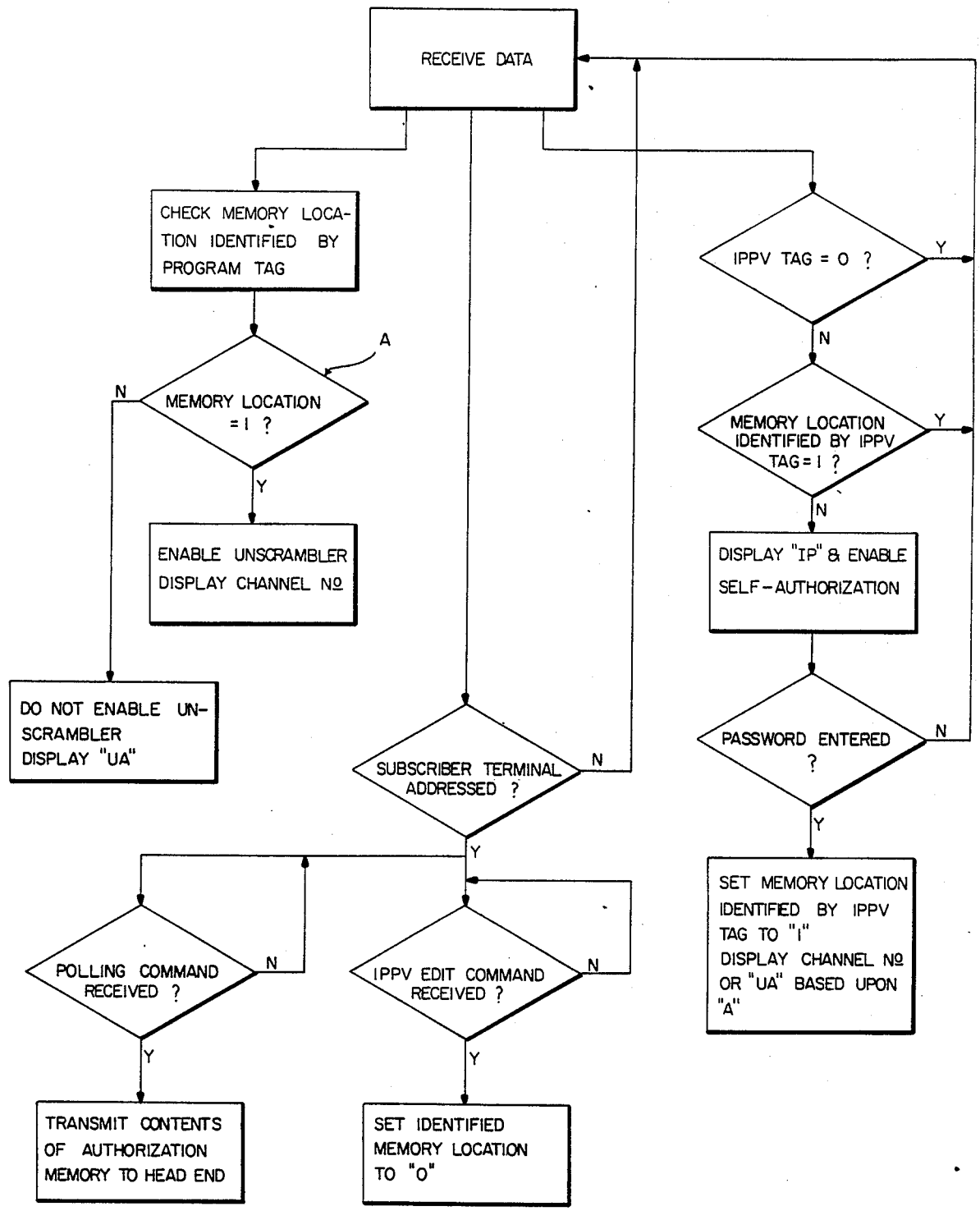
FIG. 3 is a flow chart illustrating operation of the invention.

In FIG. 3, a flow chart describes the functional operation of the system of the invention. Considering first the left-most portion of the flow chart, data is received and the authorization memory location identified by the program tag is checked to see whether there is an authorization bit of "1" or a non-authorization bit of "0" therein. If there is an authorization bit of "1", the unscrambler in the encoder is enabled and the decoder display shows the channel number. If the memory location bit is "0", the unscrambler is not enabled and the display indicates the letters UA to indicate an unauthorized channel. In the right most portion of the flow chart, the IPPV tag in the received data is interrogated to see if it is a zero. If it is a zero, nothing further occurs since selfauthorization of the terminal is not available. If it is not zero, the memory location identified by the IPPV tag is checked to see whether it contains a "1" or a "0". If it contains a "1", nothing further transpires since that particular subscriber terminal is authorized for the IPPV program. If it contains a "0", the display indicates the letters IP and the self-authorization mode is enabled. Upon entry of the password, the memory location identified by the IPPV tag is set to "1" and either the channel number or the letters UA are displayed depending upon the result of "A" (whether the memory location of the program tag is set to "1" or "0"). This completes the self-authorization routine.

The center portion of the flow chart depicts the polling and resetting of the IPPV memory locations. The initial inquiry is whether the received data packet is for the particular terminal. Consequently, the address is checked. If the data packet is for the terminal, an inquiry is made as to whether an IPPV edit command has been received, and if so, the identified memory location is set to "0". An inquiry is also made as to whether a polling command has been received, and if so, the contents of the authorization memory are transmitted to the headend.

With the invention, a very simple method of operating an impulse pay per view television system is made available. It is recognized that numerous changes and modifications in the described embodiment of the invention may be made without departure from its true spirit and scope. The invention is to be limited only as defined in the claims.

What is claimed is:

1. A method of operating a pay per view television system including a head end and a plurality of subscriber terminals, each having unscrambling means operable under control of memory means having a plurality of memory locations for storing program authorization data received from the head end for permitting operation of the unscrambling means based upon a program tag in a transmitted data signal, comprising the steps of:

transmitting, from said head end, a data signal having a program tag and a pay per view tag identifying a first and a second memory location, respectively, in said subscriber terminals;

enabling subscribers to directly input authorization data to said second memory location for permitting viewing a television signal in response to said program tag identifying said second memory location independent of intervention by said head end; and collecting information from the subscriber terminals to determine the status of the authorization data at said second memory locations.

2. The method of claim 1 wherein the presence of a pay per view tag is visually communicated to subscriber terminals.

3. The method of claim 2 wherein said television signal is in scrambled form and wherein said program tag associated with said scrambled television signal is changed by said head end to indicate the memory location identified by said pay per view tag to permit viewing of said television signal.

4. The method of claim 3 wherein the subscriber is provided with a keyboard and a coded password for directly inputting authorization data to said second memory location.

5. The method of claim 2 wherein said television signal is initially receivable in unscrambled form by all subscriber terminals for a preview time period and wherein said program tag identifying said television signal is later changed by said head end to indicate the memory location identified by said pay per view tag.

6. The method of claim 5 wherein the subscriber is provided with a keyboard for entering a coded password for directly inputting authorization data to said second memory location.

7. A method of operating a pay per view television system including a head end and a plurality of subscriber terminals, each having an authorization memory comprising a plurality of memory locations for storing authorization data received from said head end and means enabled for unscrambling a received television program in response to authorization data stored in a memory location identified by a simultaneously received program tag, comprising the steps of:

transmitting, from said head end, a pay per view tag identifying a memory location of said authorization memory corresponding to a selected pay per view television program;

enabling subscribers to directly input authorization data to said memory location; and transmitting said pay per view television program together with a program tag identifying said memory location.

8. The method of claim 7 including the step of:

collecting information by said head end from said subscriber authorization memories; and determining at said head end the subscribers who have directly inputted authorization data to said memory location.

9. The method of claim 8 including the step of:

visually communicating the receipt of said pay per view tag at subscriber terminals.

10. The method of claim 9 wherein said pay per view tag may have a zero or a non-zero value, said subscriber terminals being enabled for directly inputting authorization data to said memory location only in response to a non-zero pay per view tag.

11. The method of claim 7 wherein said pay per view tag is transmitted by said head end for a predetermined time period for enabling direct self-authorization of subscriber terminals only during that predetermined time period.

12. The method of claim 10 wherein said pay per view tag is transmitted by said head end with a non-zero value for a predetermined time period for enabling direct self-authorization of subscriber terminals only during that predetermined time period.

* * * * *